United States Patent [19]

Nakamura et al.

[11] Patent Number: 4,503,830
[45] Date of Patent: Mar. 12, 1985

[54] APPARATUS FOR CONTROLLING FUEL INJECTION TIMING

[75] Inventors: Tetsuya Nakamura, Kariya; Nobuhito Hobo, Inuyama; Yoshihiko Tsuzuki, Toyota; Yutaka Suzuki, Nishio; Satoshi Haseda, Kariya; Akira Masuda, Aichi, all of Japan

[73] Assignee: Nippondenso Co., Ltd., Kariya, Japan

[21] Appl. No.: 582,227

[22] Filed: Feb. 21, 1984

[30] Foreign Application Priority Data

Feb. 22, 1983 [JP] Japan .................................. 58-28779
Apr. 12, 1983 [JP] Japan .................................. 58-64951

[51] Int. Cl.³ .......................................... F02M 59/20
[52] U.S. Cl. .................................. 123/501; 123/417; 123/502
[58] Field of Search ............... 123/501, 357, 502, 416, 123/417

[56] References Cited

U.S. PATENT DOCUMENTS

| | | | |
|---|---|---|---|
| 4,397,283 | 8/1983 | Komaroff et al. | 123/501 |
| 4,450,817 | 5/1984 | Ibuki et al. | 123/501 |
| 4,463,729 | 8/1984 | Bullis et al. | 123/501 |

FOREIGN PATENT DOCUMENTS

| | | | |
|---|---|---|---|
| 52530 | 5/1981 | Japan | 123/501 |
| 146023 | 11/1981 | Japan | 123/357 |
| 135333 | 8/1983 | Japan | 123/357 |

Primary Examiner—Magdalen Y. C. Moy
Attorney, Agent, or Firm—Cushman, Darby & Cushman

[57] ABSTRACT

In a diesel engine controlling system having a fuel injection pump, a fuel injection timing adjusting device is controlled by a drive pulse signal whose duty cycle is controlled by a microcomputer. The duty cycle is determined such that a basic duty cycle obtained by using engine rotational speed and injection quantity, is modified or corrected by way of a correction factor and a forecast correction factor. The-first mentioned correction factor comprises an integration component and a proportional component both derived from the difference between a measured fuel injection or ignition timing and a desired or reference fuel injection or ignition timing, which is calculated by using the engine rotational speed and the injection quantity. The forecast correction factor corresponds to a differential value of the basic duty cycle or the desired fuel injection or ignition timing. In order to detect the fuel injection or ignition timing a timing detector is employed, where the state of an output signal from the detector is monitored to prohibit calculation of the difference or error, thereby correcting the basic duty cycle by only the forecast correction factor when the detector is in abnormal condition.

14 Claims, 21 Drawing Figures

FIG. 1

APPARATUS FOR CONTROLLING FUEL INJECTION TIMING

BACKGROUND OF THE INVENTION

This invention relates generally to apparatus for controlling timing of fuel injection into diesel engines, and more particularly relates to such apparatus using a computer.

In some known apparatus for controlling fuel injection timing, an actual timing of fuel injection into cylinders of a diesel engine is detected, while a desired or reference timing is set by using various engine operating parameters, and these actual and reference timings are used to derive the difference therebetween which is considered as an error component of the actual injection timing. Then a fuel injection timing controlling device operates in accordance with the difference or error so as to minimize the difference, thereby achieving the coincidence between the actual and reference timings.

The present invention is an improvement of such a known apparatus, and contemplates to improve transient response and controlling accuracy which are not sufficient in the known apparatus.

SUMMARY OF THE INVENTION

The present invention has been developed in order to remove the above-described drawbacks inherent to the conventional fuel injection timing control apparatus.

It is, therefore, an object of the present invention to provide new and useful apparatus for controlling timing of fuel injection into diesel engine cylinders.

According to a feature of the present invention a fuel injection timing adjusting device is controlled by a computer such that a basic duty cycle of a pulse train drive signal determined by using engine rotational speed and fuel injection quantity, and fed to the timing adjusting device is corrected by both a basic correction factor based on the error of fuel injection or ignition timing, and a forecast factor based on the variation rate of the basic duty cycle or a desired fuel injection or ignition timing.

The correction factor based on error may include a proportional factor and an integration factor, while the forecast correction factor corresponds to a differential value of either the basic duty cycle or the desired fuel injection or ignition timing.

In addition to the above feature, the present invention contemplates to provide such apparatus which does not malfunction even when a timing detector sensing the fuel injection or ignition timing is out of order or the like.

BRIEF DESCRIPTION OF THE DRAWINGS

The object and features of the present invention will become more readily apparent from the following detailed description of the preferred embodiments taken in conjunction with the accompanying drawings in which:

FIG. 1 is a schematic block diagram of an embodiment of the apparatus according to the present invention, showing how the basic duty cycle is corrected;

The same or corresponding elements and parts are designated at like reference numerals throughout the drawings.

DETAILED DESCRIPTION OF THE INVENTION

Figure 1:
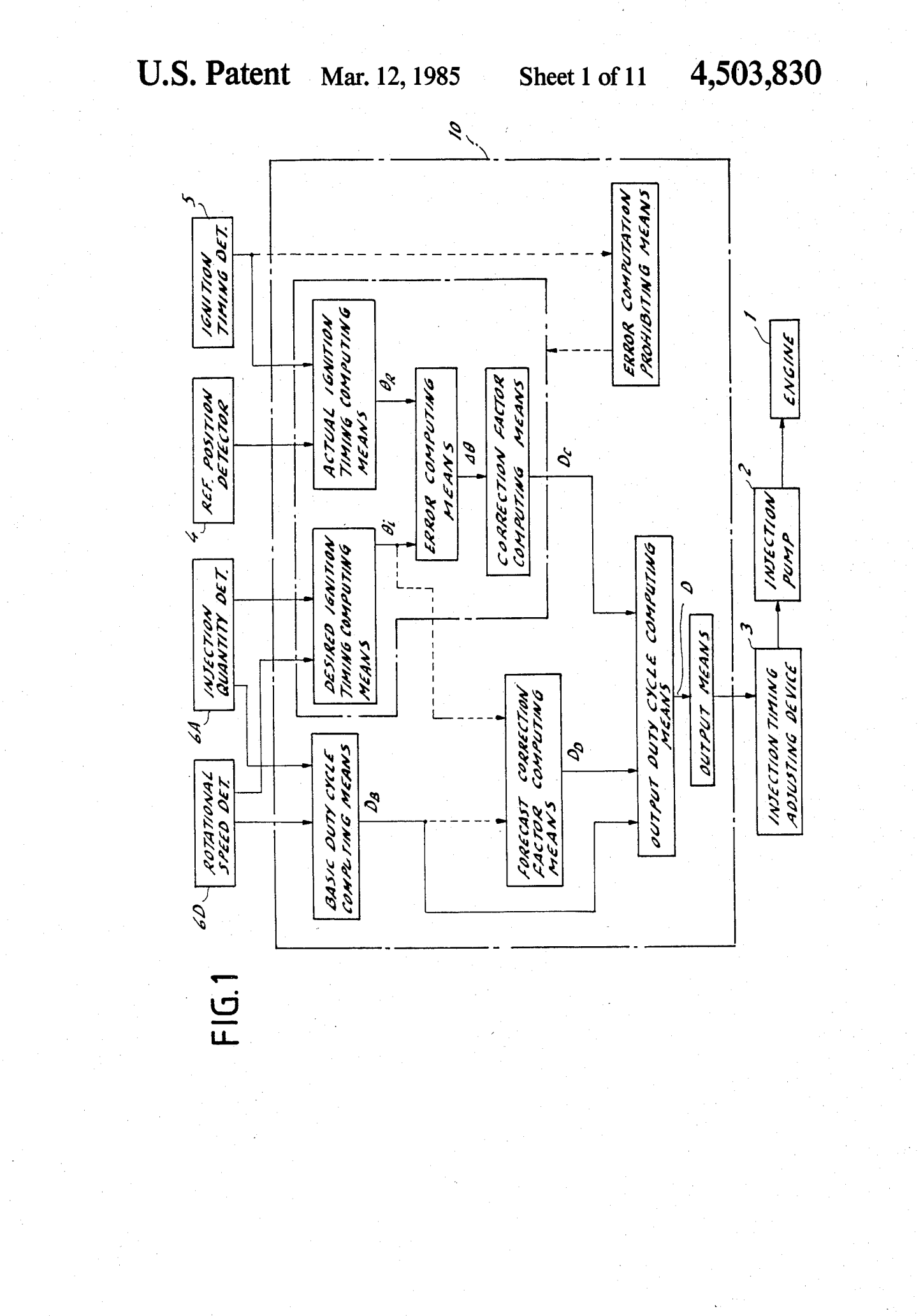
Figure 2:
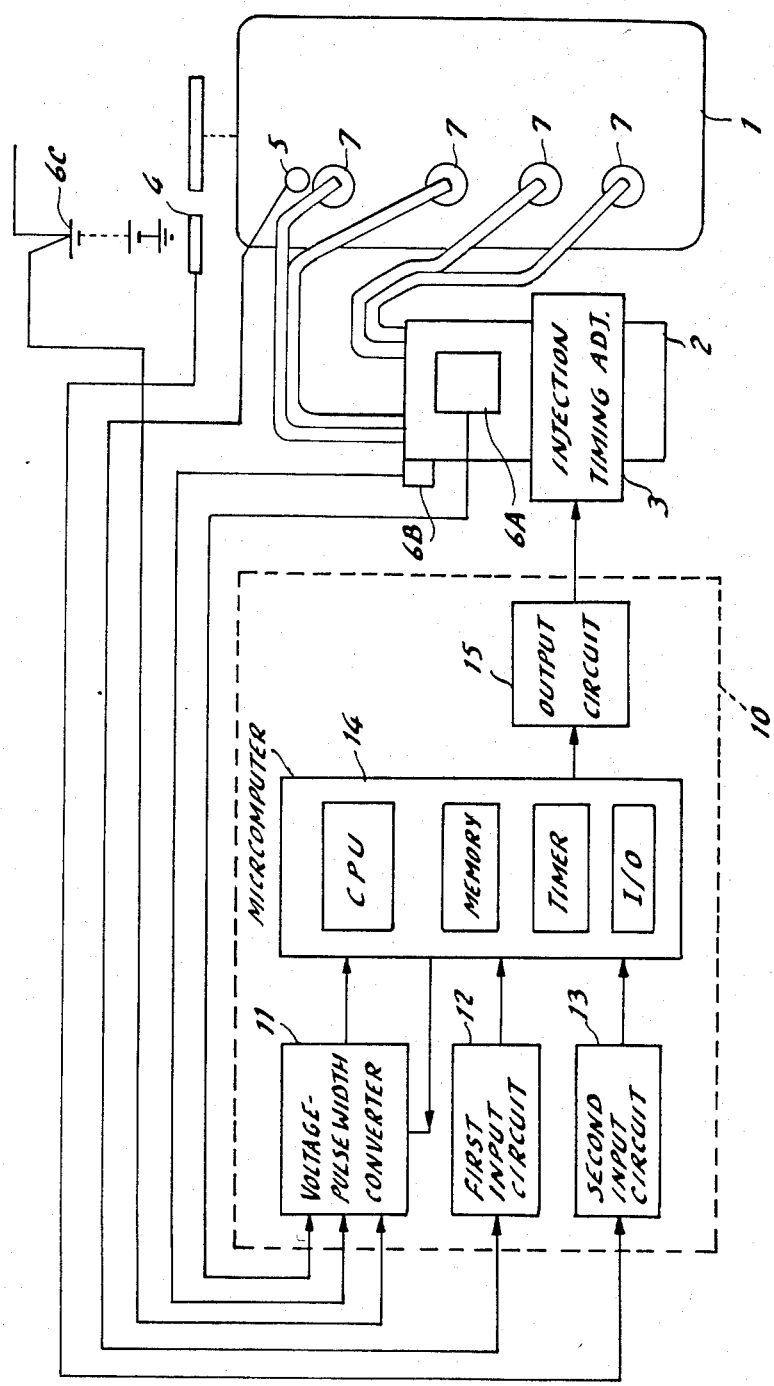
FIG. 2 is a schematic diagram showing an engine control system to which the present invention is applicable.

As will be described hereinlater, the apparatus according to the present invention comprises a microcomputer which operates in accordance with predetermined programs. Prior to describing detailed operations of the microcomputer, reference is now made to FIG. 1 which shows a schematic block diagram of the apparatus according to the present invention. In FIG. 1, an electronic controlling unit 10 including the above-mentioned microcomputer is shown to include various means for easy understanding of the function thereof.

A diesel engine 1, which is to be controlled, receives fuel from a fuel pump 2 where fuel injection timing is controlled by a fuel injection timing adjusting device 3. Various engine operating parameter detectors or sensors are provided to detect the operating condition of the engine 1. As the engine operating parameter detectors are provided a reference position detector 4, an igniting timing detector 5, a rotational speed detector 6D, and a fuel injection quantity detector 6A for respectively detecting a reference crank angle, an actual timing of fuel combustion, engine rotational speed, and quantity of fuel injected into engine cylinders.

The electronic control unit 10 computes a basic duty cycle $D_B$ of a drive signal fed to the fuel injection timing adjusting device 3, by using the rotational speed signal and the fuel injection quantity signal, and also computes a desired or reference ignition timing $\theta$1 by using the rotational speed signal and the fuel injection quantity signal, while an actual ignition timing $\theta R$ is computed by using the reference position signal and the ignition timing signal. Then a difference or error $\Delta\theta$ is caculated by using the actual ignition timing $\theta R$ and the the desired ignition timing $\theta i$, and a correction factor $D_C$ is computed from the error $\Delta\theta$. Furthermore, a forecast correct factor $D_D$ is computed on the basis of a variation of the basic duty cycle or the desired ignition timing. Then the forecast correction factor $D_D$ and the correction factor $D_C$ are used to determine an output duty cycle D by an output dyty cycle computing means, which output duty cycle D is outputted via an output means to be fed to the injection timing controlling means 3.

The electronic control unit 10 is also arranged to determine whether the ignition timing signal from the ignition timing detector 5 is correctly inputted thereto, and suspends the operation for the above-mentioned computation of the error when the ignition timing signal is abnormally inputted, so that the output duty cycle is obtained by using only the basic duty cycle $D_B$ and the forecast correction factor $D_D$. Such function for preventing malfunction is illustrated as an error computation preventing means in FIG. 1.

An embodiment of the present invention will be described with reference to FIGS. 2 through 16. FIG. 2 shows a schematic diagram of an engine control system to which the present invention is adapted. The reference 1 is a diesel engine having a plurality of cylinders which are supplied with fuel under pressure via injection nozzles 7 from a distributor fuel injection pump 2. The fuel injection timing is controlled within the fuel injection pump by means of the injection timing adjusting device 3 which is so called electro-hydraulic timer.

The reference position detector 4 is used to detect a reference crank position of the engine 1, and comprises a toothed wheel rotatable in synchronization with the engine crankshaft and an electromagnetic pickup facing a tooth of the toothed wheel. This reference position detector 4 is also used to measure the rotational speed of the engine 1.

Figure 4:
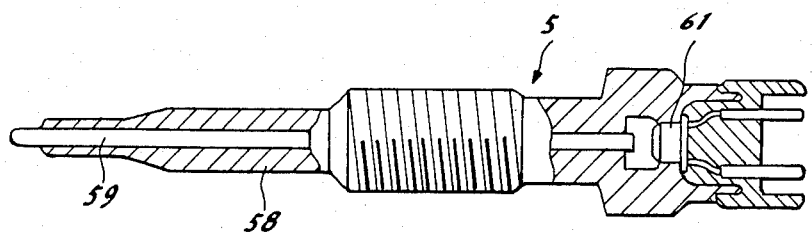
FIG. 4 is a schematic cross-sectional view of the ignition timing detector shown in FIGS. 1 and 2.

As the ignition timing detector 5 may be used one for instance, having a structure as shown in FIG. 4. The detector 5 comprises a bar-like member 59 made of a light-transmitting substance, such as a heatproof glass bar made of quartz glass, is fitted in a hollow cylindrical housing 58 made of a heatproof substance. This bar glass 59 is secured within the housing 58 by means of an adhesive 41 in such a manner that a tip portion of the bar glass 59 protrudes from the tip portion of the housing 58 by 1 to 5 millimeters so that an exposed tip portion of the bar glass 59 functions as an ignition light detecting portion.

Within a bore of the housing 59, around the other end, is provided a photosensitive element 61 such as a phototransistor, so that ignition light transmitted through the bar glass 59 is incident thereon. Thus the photosensitive element 61 converts the ignition light incident thereon to an electrical signal.

Figure 5:
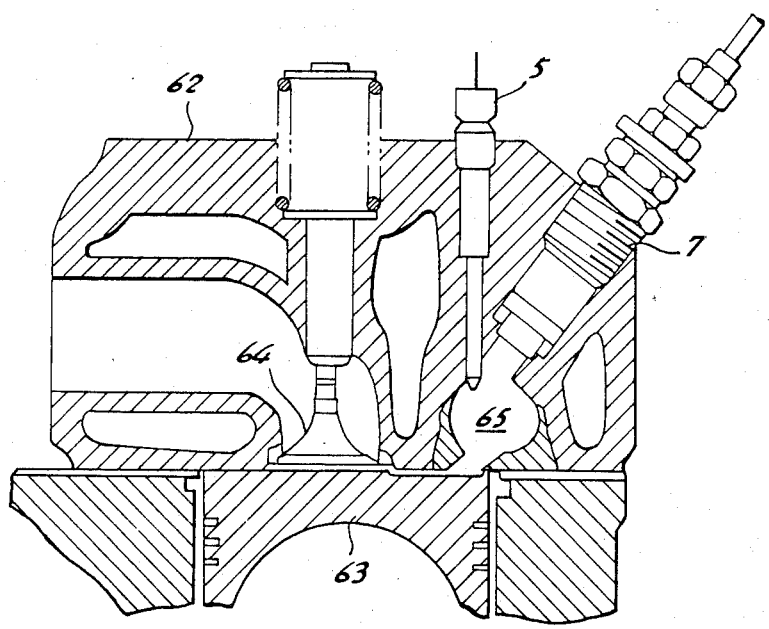
FIG. 5 is a schematic cross-sectional view of the cylinder head of the engine of FIGS. 1 and 2, showing the way of installation of the ignition timing detector of FIG. 4.

FIG. 5 illustrates how the ignition timing detector 5 is provided to a diesel engine 1 having a swirl chamber 65. The reference 62 is a cylinder head; 63, a piston; 64, an exhaust valve; and 7, a fuel injection nozzle. As shown in FIG. 5, the ignition timing detector 5 is screwed into a threaded through-hole made at the cylinder head 62 so that the tip portion of the detector 5 penetrates the cylinder head 62 to be located in the swirl chamber 65. It is preferable that the location of the tip portion of the ignition timing detector 5 is such that fuel spray injected from the injection nozzle 7 is directed to clean and sweep away the soot attached to the tip portion.

Turning back to FIG. 2, the injection quantity detector 6A is used to measure an actual quantity of fuel injected by the fuel injection pump 2 or a desired quantity of fuel, and comprises a sensor which detects the position of a spill ring of the injection pump 2 for instance. The temperature detector 6B senses the temperature of the fuel to be supplied to the engine 1, while the battery detector 6C is used to detect the voltage of a battery.

The electronic control unit 10 comprises a voltage-to-pulse width converter 11, first and second input circuits 12 and 13, a microcomputer 14, and an output circuit 15. The microcomputer 14 comprises memories, a timer and a central processing unit (CPU) arranged to process data of 8-bit or 12 bit. The electronic control unit 10 is arranged to supply the ignition timing adjuting device 3 with a pulse train signal having a desired duty cycle via the output circuit 15 so as to control the fuel injection timing as will be described in detail hereinlater. The voltage-to-pulse width converter 11 may be actualized by an integrated circuit MB4053 manufactured by Fujitsu Co. Ltd., which includes an analog multiplexer for selecting its plurality of input signals in sequence in response to a timing control signal, and a voltage-to-pulse width converting circuit responsive to an output signal from the multiplexer.

Figure 3:
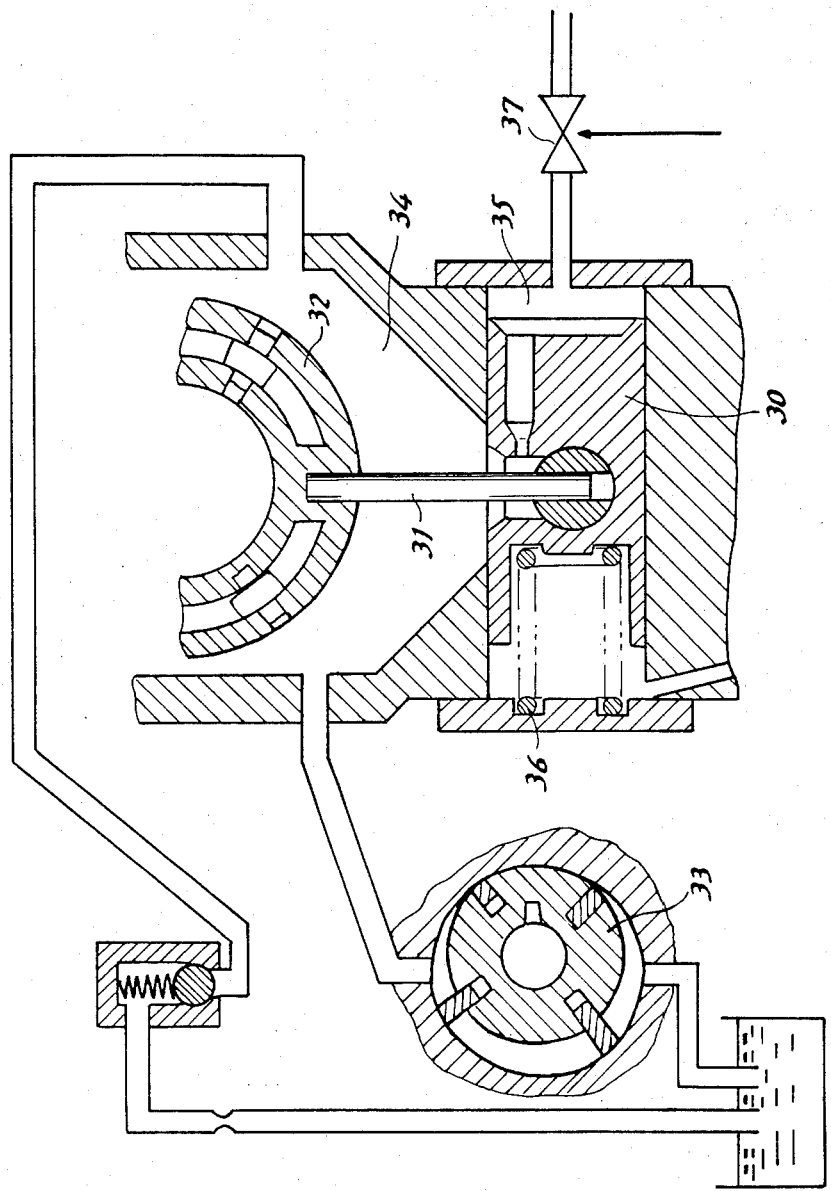
FIG. 3 is a schematic cross-sectional view of the injection timing adjusting device shown in FIGS. 1 and 2.

The injection timing adjusting device 3 has a structure as shown in FIG. 3 for instance. In FIG. 3, a timer piston 30 is coupled with a roller ring 31 by way of a pin 31 so that a left movement of the timer piston 30 in the drawing causes a clockwise rotation of the roller ring 32 to advance the ignition timing.

The reference 33 is a vane type fuel pump having a rotary member driven by an unshown drive shaft of the injection pump. This fuel pump 33 sends fuel from the fuel tank to a pressure chamber 34 of the fuel pump under given low pressure. Fuel in the pressure chamber 34 is injected into engine cylinders and is also led to a high-pressure chamber 35 of the timer piston 30 via an orifice. Thus, the position of the timer piston 30 is determined such that the pressure in the high-pressure chamber 35 is in equilibrium with a force of a return spring 36 within a low-pressure chamber. As a result, the position of the roller ring 3 and therefore the injection timing is determined. The reference 37 is a solenoid operated valve used for pressure adjustment. Namely, the solenoid operated valve 37 is responsive to a drive signal from the electronic control unit 10 for controlling the pressure of fuel in the high-pressure chamber 35 by changing open/close time ratio, thereby determining the position of the timer piston 30 and therefore the injection timing.

Figure 6:
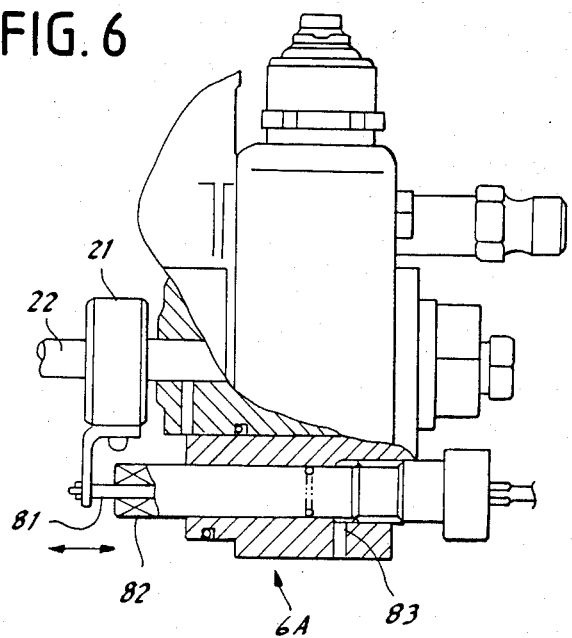
FIG. 6 is a schematic partial cross-sectional view of the actual injection quantity detector shown in FIGS. 1 and 2.

FIG. 6 shows the actual injection quantity detector 6A having a spill ring 21, and a plunger 22 arranged to move left and right with rotation by an unshown face cam for pressurizing and distributing fuel. The detector 6A comprises a movable core 81 which is secured to the spill ring 21 by way of a lever to move together therewith. A pair of coils 82 are wound around a cylindrical bobbin (not shown) in which the movable core 81 is arranged to slidingly move, and a body of the detector is secured to the pump head by a screw 83. As the movable coil 81 moves to change its position within the bore of the bobbin of the coils 82, the inductance of each of the coils 82 is changed. These two coils 82 constitute a differential transformer such that one of the coils 82 receives an exciting current and the other coil generates an output voltage. Therefore, in the case that the quantity of fuel injection is great, the output voltage from the detector 6A is low, such as 1 volt. On the contrary, in the case of a small fuel injection quantity, such as during idling, the spill ring 21 moves left to cause a larger stroke of the core 81, and thus an output voltage, such as 3 volts is derived.

As shown in FIG. 2, the voltage-to-pulse width converter 11 of the electronic control unit 10 produces a pulse signal whose width is indicative of each analog input voltage from the actual injection quantity detector 6A, the fuel temperature detector 6B, and the battery detector 6C.

Figure 7:
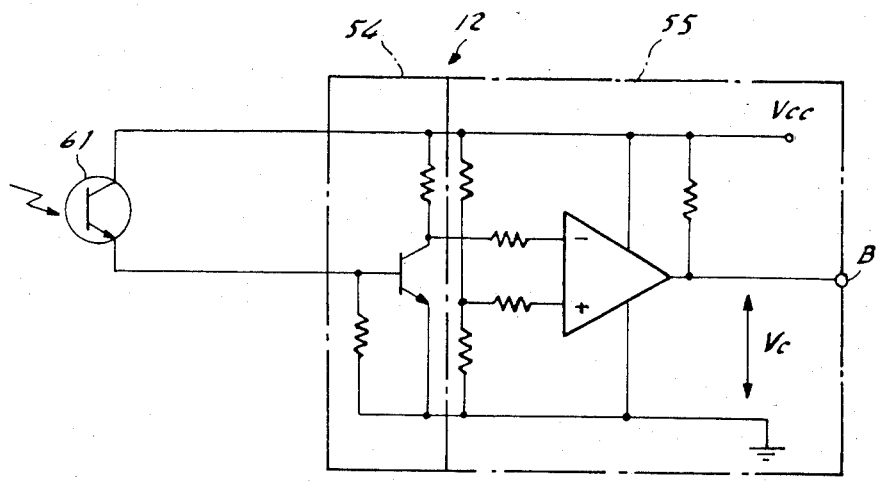
FIG. 7 is a circuit diagram of the first input circuit shown in FIG. 2.
Figure 9:
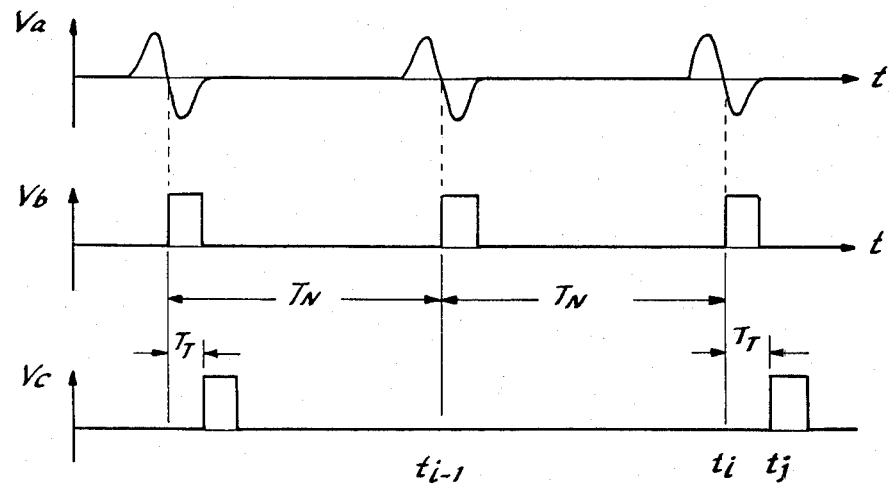
FIG. 9 is a timing chart showing signals around the first and second input circuits of FIGS. 7 and 8.

FIG. 7 shows a detailed circuit diagram of the first input circuit 12 of the electronic control unit 10. The first input circuit 12 comprises an amplifier 54 responsive to an output signal from the phototransistor 61 of the ignition timing detector 5, and a waveform shaping circuit 55 which converts the waveform of an output signal from the amplifier 54 to a rectangular waveform. An output signal voltage obtained at an output terminal B of the first input circuit 12 assumes a waveform as shown in FIG. 9 (see Vc).

Figure 8:
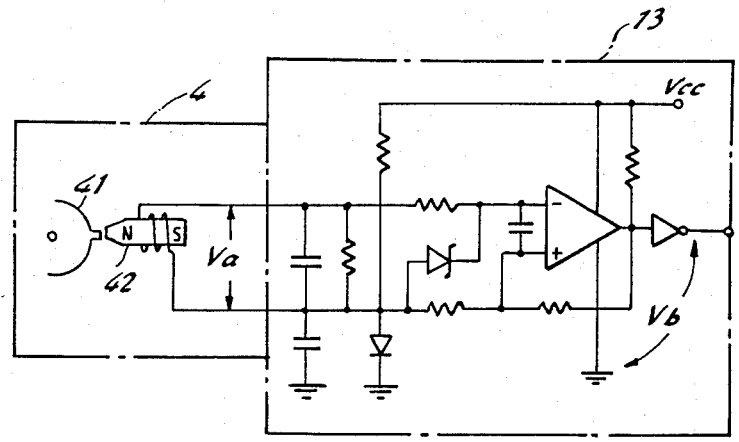
FIG. 8 is a circuit diagram of the second input circuit shown in FIG. 2.

FIG. 8 shows a detailed circuit diagram of the second input circuit 13 of the electronic control unit 10. The above-mentioned reference position detector 4 comprises a toothed wheel 41 arranged to rotate in synchronization with the engine crankshaft, and an electromagnetic pickup 42 for detecting when the tooth of the toothed wheel 41 passes. Therefore, the electromagnetic pickup 42 produces an alternating current signal Va (see FIG. 9) when the crankshaft assumes a predetermined reference crank angle at a position after top dead center. This alternating current signal is fed to the second input circuit 13 which substantially functions as a waveform shaping circuit, and then an output pulse signal Vb (see FIG. 9) is obtained at an output terminal of the second input circuit 13. When the output signal from the reference position detector 5 is inputted via the second input circuit 13 to the microcomputer 14, the microcomputer 14 measures the duration TN betweeen two consecutive pulses by counting the number of clock pulses gated for the duration ob by reading a value of the timer so as to calculate the rotational speed of the engine 1. Furthermore, when the output signal from the ignition timing deteor 4 is inputted via the first input circuit 12 to the microcomputer 14, the time difference TT between a pulse of the signal Vb and a subsequently coming pulse of the signal Vc is measured. By using this time difference and the obtained rotational speed, it is possible to obtain a crank angle rotated from the reference crank angle till the instant of actual ignition, namely, actual ignition timing with respect to the reference crank angle.

Figure 10:
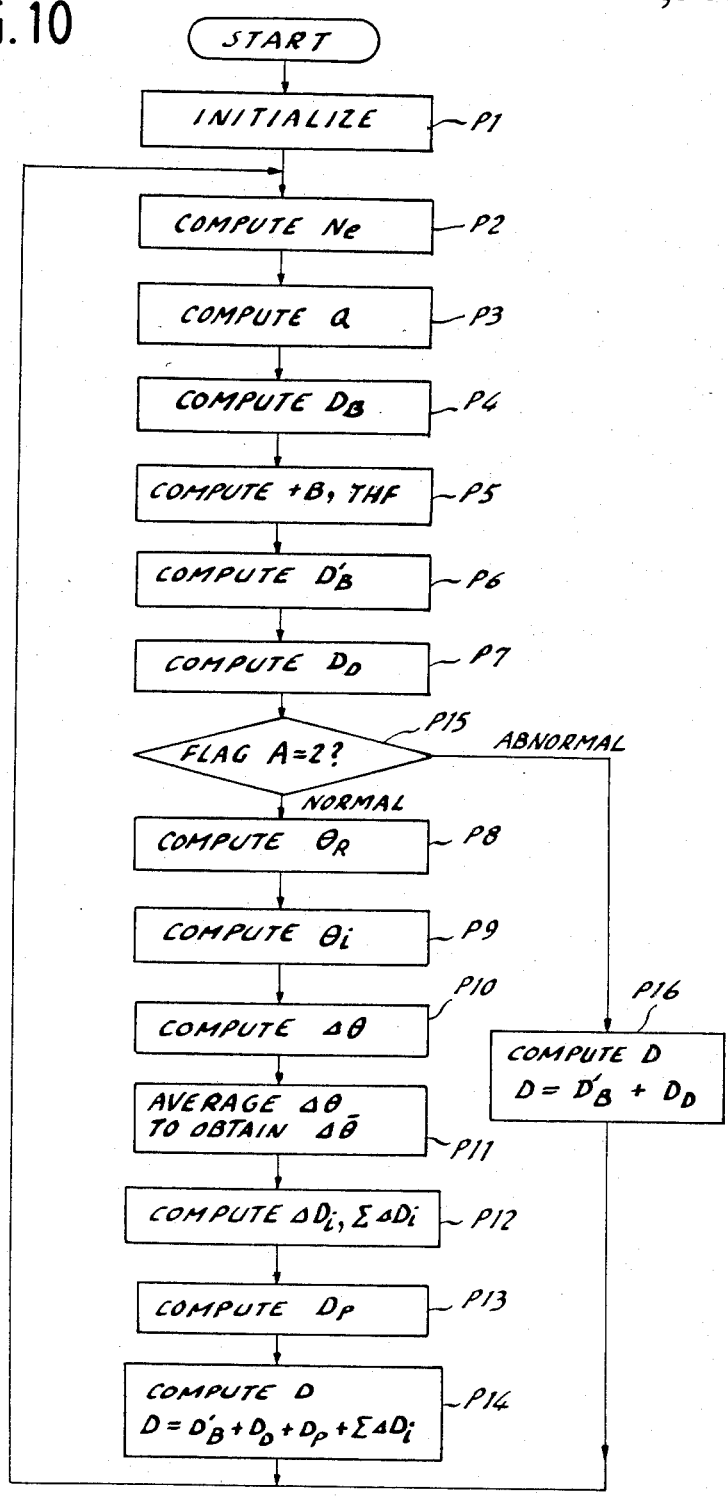
FIG. 10 is a schematic flowchart of a main routine of the program provided for the micrcomputer of FIG. 2.

FIGS. 10 through 15 are flowcharts showing various operations executed by the microcomputer 14. FIG. 10 shows a main routine while FIGS. 11-15 show various interrupt service routines, and these programs are pre-stored in an nonvolatile memory, such as a read-only memory, included in the memories of the microcomputer 14.

In the main routine of FIG. 10, when power is applied to the microcomputer 14, necessary initialization is effected in a step P1. Then in a step P2, engine rotational speed Ne is obtained with a reciprocal of the period TN of the output pulse signal Vb from the reference position detector 4 being multiplied by a constant. It is arranged that an interruption occurs in response to a leading edge of the pulse of the signal Vb from the reference position detector 4 so as to execute a reference position interrupt service routine of FIG. 11 to obtain the above-mentioned pulse period $T_N$. In detail, in the reference position interrupt service routine of FIG. 11 the value ti of the timer at the instant of the presence of the leading edge of the pulse of the signal Vb is read in a step R1, and then the difference between the value ti of the timer and a former value ti−1 is obtained in a step R2 to determine the pulse period $T_N$ (=ti−(ti−1)). In a subsequent step R3, an actual fuel injection timing $T_T$(=ti−tj) is obtained wherein tj is a value of the timer at the instant of the presence of the leading edge of a pulse of the signal Vc, which comes subsequently. When the pulse period $T_T$ and the actual fuel injection timing $T_T$ are obtained, it is regarded that the signal from the reference position detector 4 has been normally produced, and therefore a flag F1 named abnormal condition cancellation flag, is set to logic "0" in a following step R4.

Figure 11:
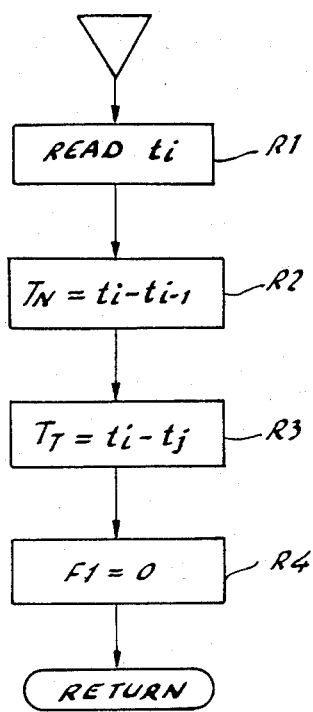
FIGS. 11 through 15 are schematic flowcharts of various interrupt service routines of the program.
Figure 12:
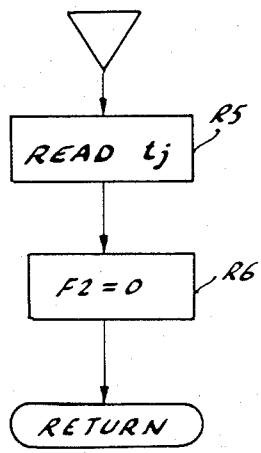

Another interrupt service routine named an actual timing signal interuption service routine, which is shown in FIG. 12, is started in response to a leading edge of a pulse of the signal Vc from the ignition timing detector 5. Namely, the above-mentioned value tj of the timer is read in a step R5 of this interrupt service routine in advance when the leading edge of the pulse of the signal Vc is detected, so that the read value tj will be used in the step R3 of the first-mentioned interrupt service routine of FIG. 11. A step R6 is for setting another abnormal condition cancellelation flag F2 to logic "0". The usage of these flags F1 and F2 will be described hereinlater.

Turning back to the main routine of FIG. 10, an actual fuel injection quantity Q is calculated in a step P3. The actual fuel injection quantity Q is calculated by using a time value $T_Q$ which is obtained by a program interrupt service routine shown in FIG. 14, which routine is arranged to be executed after the execution of a step R11 included in a timer interrupt service routine of FIG. 13. This timer interrupt service routine is arranged to be periodically executed at a predetermined time interval. In this timer interrupt service routine, a value $T_S$ of the timer is read in a step R10 when a leading edge of the pulse signal from the voltage-to-pulse width converter 11 is detected. In a step R11, the trailing edge of the pulse output from the voltage-to-pulse width converter 11 is monitored so that the operational flow jumps to the program interrupt serivice routine of FIG. 14 in the presence of the trailing edge. In the program interrupt service routine, a value $T_E$ of the timer at the instant of the presence of the trailing edge is read in a step R16, and then it is determined which one of the three input signals of the voltage-to-pulse width converter 11 is the applied pulse signal in a step R16'. Namely, this step R16' actually includes two determination steps for determining the sort of the input signal from the voltage-to-pulse width converter 11 by checking a flag F arranged to change cyclically as 1, 2, 3, 1, 2 . . . . In the case that the input signal represents the fuel injection quantity, a step R17 is executed to obtain the above-mentioned time value $T_Q$ by subtracting time $T_S$ from the time $T_E$. This time value $T_Q$ represents the width of the output pulse from the voltage-to-pulse width converter 11, and therefore the actual fuel injection quantity. This time value $T_Q$ is used in the step P3 of the main routine to calculate an actual injection quantity Q. In the case that the input signal represents the fuel temperature THF or battery voltage +B, steps R17' or R17'' is executed in the same manner so as to determine the pulse width. In the steps R17' and R17'', $T_{THF}$ and $T_{+B}$ respectively indicate the pulse widths obtained as the difference between $T_E$ and $T_S$. Then in a step R18 the value of the flag F is increased by one to designate a next sort of the input signal for subsequent pulse width determination.

Figure 13:
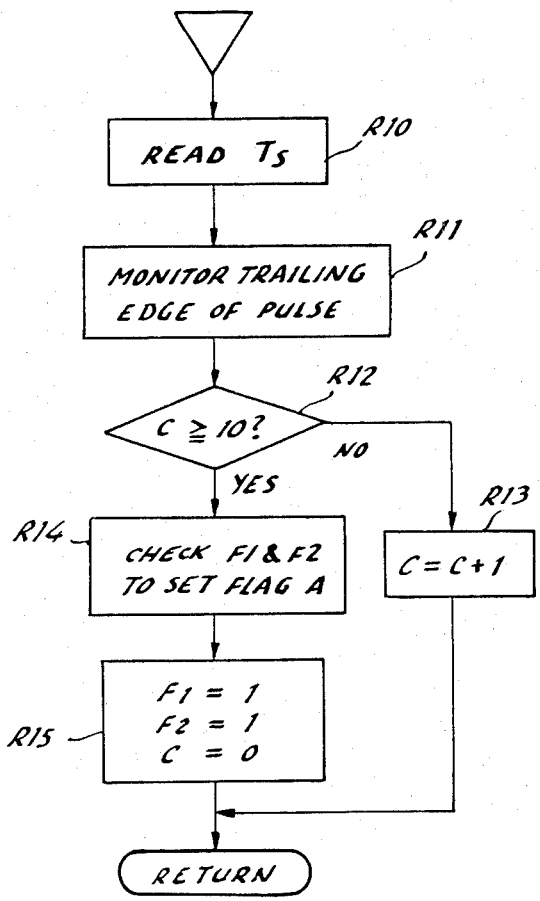

When executing the timer interrupt service routine of FIG. 13, it is determined whether the reference position detector 4 and the ignition timing detector 5 are in normal condition or not once per ten cycles of the routine. This determination is effected by steps R12 through R15. Namely, in the step R12 it is determined whether a variable C is equal to or greater than 10 or not. This variable C may be a count which is arranged to be increased by one in a step R13 executed when C is less than 10. When the variable or count C reaches 10, a step R14 is executed to check whether the reference position detector 4 and the ignition timing detector 5 are in normal normal condition or in abnormal condition by detecting the state of the flags F1 and F2.

In the case that both the flags F1 and F2 are of logic "0", it is determined that both the reference position detector 4 and the ignition timing detector 5 are in normal condition. In the case that F1=0 and F2=1, it is determined that the reference position detector 4 is in normal condition while the ignition timing detector 5 is in abnormal condition. On the other hand, when F1=1 and F2=0, it is determined that the reference position detector 4 is in abnormal condition while the ignition timing detector 5 is in normal condition. Since the probability that both F1 and F2 are of logic "1" is extremely low, such state is regarded as a nonoperating condition of the engine 1. In this way, the state of the two flags F1 and F2 is detected, and another flag A is set to one of 1, 2, 3 and 4 depending on detected state among these four states.

Then in a step R15, the flags F1 and F2 are both set to logic "1" respectively so that these flags F1 and F2 will be reset to logic "0" in the steps R4 and R6 respectively when these interrupt service routines of FIGS. 11 and 12 have been executed. In addition the count C is reset to zero in the step R15.

Figure 16:
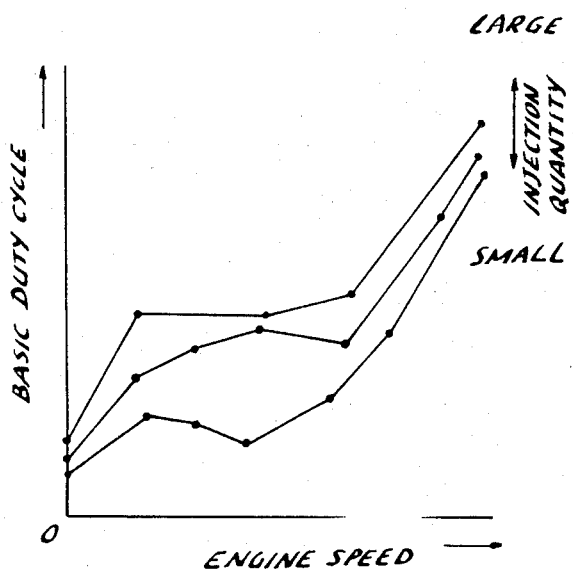
FIG. 16 is a graphical representation showing the relationship between engine rotational speed and the basic duty cycle with a parameter of fuel injection quantity.

In a step P4 of the main routine, a basic duty cycle $D_B$ is obtained by using the rotational speed Ne and the actual injection quantity Q. This is achieved by searching a corresponding value from a plurality of values arranged in the form of a map stored in the memory or by using a predetermined formula. FIG. 16 shows an example of the relationship between engine rotational speed Ne and basic duty cycle $D_B$ using actual injection quantity Q as a parameter.

Figure 14:
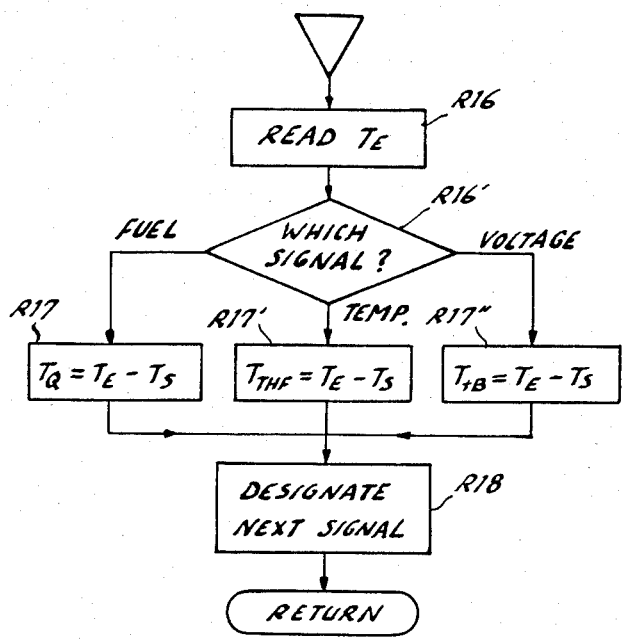
Figure 15:
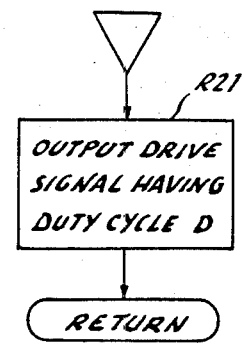

In a subsequent step P5, digital data indicative of the battery voltage and the fuel temperature are respectively calculated by using the above-mentioned values $T_{THF}$ and $T_{+B}$ obtained in the steps R17' and R17'' of the routine of FIG. 14 in the same manner as in the step P3. These data +B and THF are used in a step P6 to correct the basic duty cycle $D_B$ obtained in the step P4, thereby oataining a corrected basic duty cycle $D'_B$. In a step P7, the difference between a former $D_{Bi-1}$ and a present $D'_{Bi}$, i.e. $\Delta D'_B = D_{Bi} - D'_{Bi-1}$, is calculated, and then a forecast correction factor $D_D$ is calculated by using the difference $\Delta D'_B$ as a function, such as one similar to quadratic function, of $\Delta D'_B$.

In a step P15, it is determined whether the flag A equals 2 or not for detecting whether the ignition timing sinal from the detector 5 is normally inputted. Since the flag A is set to 2 only when the above-mentioned flag F1=0, and the flag F2=1, this condition represents that the ignition timing signal is not normally inputted during engine rotation. Such abnormal condition occurs for instance, when ignition does not occur during fuel injection, when the phototransistor of the detector 5 fails to operate or when other malfunctioning in detection of ignition occurs. In the case that the flag A=2, a step P16 is executed to detemine the value of the output duty cycle D as $D = D'_B + D_D$.

On the other hand, if the flag A is other than 2, a step P8 is executed in which an acutal fuel injection timing $\theta R$ is calculated by using the time difference $T_T$.

In a following step P9, a desired fuel injection timing $\theta i$ is calculated by using the rotational speed Ne and the actual fuel injection quantity Q by way of a predetermined formula or a map. Then in a step P10, the difference $\Delta\theta$ between the desired injection timing $\theta i$ and the actual injection timing $\theta R$, and a plurality of values of the difference $\Delta\theta$ are averaged in a step P11. For instance, 16 values of $\Delta\theta$, which is renewed each time, are stored to obtain a sum thereof, and the sum is divided by 16 to obtain a mean value $\overline{\Delta\theta}$.

Then in a step P12, an integration adding factor $\Delta Di$ is obtained with the mean value $\overline{\Delta\theta}$ being multiplied by a constant. This value of $\Delta Di$ is accumulated to obtain an integration factor $\Sigma\Delta Di$. Then in step P13, a proportional factor $D_P$ is obtained with the mean value $\overline{\Delta\theta}$ being multiplied by a constant. Then in a step 14, an output duty cycle D is calculated by using these values of $D'_B$, $D_D$, $\Sigma\Delta Di$ and $D_P$ as follows:

$$D = D'_B + D_D + D_P + \Sigma\Delta Di$$

In the above, the sum of the values $D_P$ and $\Sigma\Delta Di$ corresponds to the correction factor $D_C$ shown in FIG. 1.

When the step P14 is completed, the operational flow returns to the step P2 to repeat similar calculations for detemining the output duty cycle D. As the program is being executed cyclically, a timer interruption occurs to execute a timer interrupt service routine of FIG. 15. In this routine having a single step R21, a pulse signal having a duty cycle determined by the above-mentioned output duty cycle D is outputted to the output circuit 15 of FIG. 2. This timer interrupt service routine is executed in synchronizm with the period of the driving output fed from the output circuit 15 to the injection timing adjusting device 3.

In the above-described embodiment although the basic duty cycle $D_B$ is corrected by the battery voltage +B and the fuel temperature THF so as to use the corrected basic duty cycle $D'_B$ as a duty cycle to be controlled, such correction may be omitted if desired. Namely, the basic duty cycle $D_B$ may be used as it is.

Furthermore, although the difference or error $\Delta\theta$ is averaged in the step P11 of the main routine, the integration factor Di and the proportional factor $D_P$ may be obtained without such averaging if the scattering of ignition timings is within a tolerance.

Moreover, the proportional factor $D_P$ may be omitted since ignition timing control can be effected without such a factor, and therefore the step P13 may be omitted.

In the described embodiment, although the forecast correction factor $D_D$ is obtained from the change in the corrected duty cycle $D'_B$, it is also possible to obtain the same from the change $\Delta\theta i$ in the value of the desired ignition timing $\theta i$.

Figure 17:
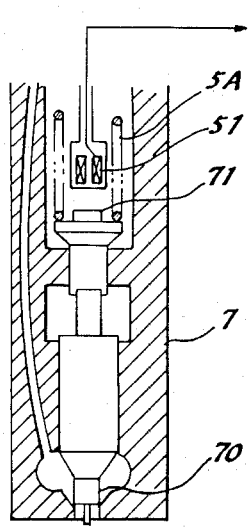
FIG. 17 is a schematic cross-sectional view of a fuel injection timing detector, which may be used in place of the ignition timing detector of FIGS. 4 and 5.

Turning back to FIG. 2, although the ignition timing detector 5 is used for detecting the timing of fuel ignition in the above-described embodiment, fuel injection timing may be directly detected in place of detection of ignition timing. In other words, the ignition timing detector 5 may be replaced with other detector which senses the timing of fuel injection. Hence, reference is now made to FIG. 17 showing the structure of a fuel injection timing detector 5A. This detector 5A is associated with one of the nozzles 7 of FIG. 2, and functions as a nozzle-valve lift detector. In detail, a magnetic member 71 is attached to one end of a valve body 70 which is movable within a bore of a nozzle body 7, and a pickup coil 51 is located to face the magnetic member 71. When fuel is fed from the fuel pump under pressure, the valve body 70 is lifted to cause the magnetic member 71 to approach the pickup coil 51, thereby changing the inductance of the pickup coil 51. The change in inductance can be detected by an input circuit 12A whose circuit diagram is shown in FIG. 18.

Figure 18:
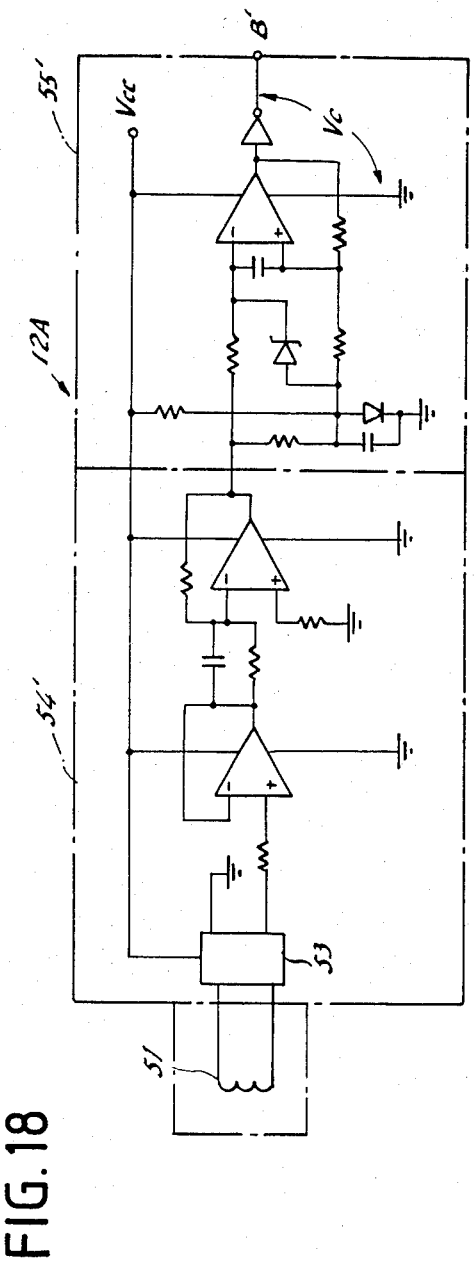
FIG. 18 is a circuit diagram of the first input circuit of FIG. 2, which is designed for use with the fuel injection timing detector of FIG. 17.
Figure 19:
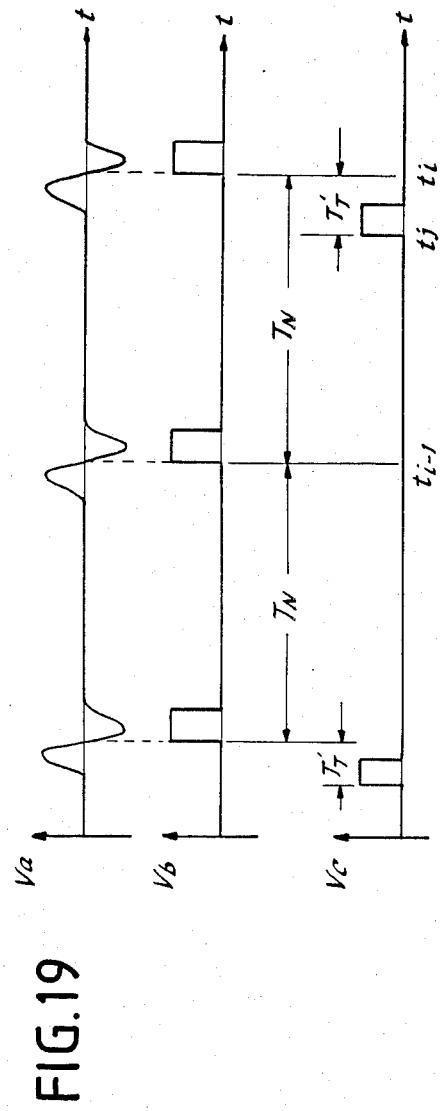
FIG. 19 is a timing chart showing signals around the first and second input circuits of FIGS. 18 and 8.

In FIG. 18, showing the input circuit 12A, which may be used in place of the first input circuit 12 of FIG. 2, the change in inductance of the pickup coil 51 is detected by an inductance detector 53 which converts the inductance to a voltage signal. Then the voltage signal from the inductance detector 53 is first amplified by an amplifier 54' and is then converted to a pulse train signal by a following waveform shaping circuit 55'. The waveform and timing of the pulse train signal developed at an output terminal B' of the waveform shaping circuit 55' is shown in FIG. 19 (see Vc). In FIG. 19, two other signals Va and Vb are the same as those in FIG. 9, and description thereof is omitted.

A duration $T'_T$ defined between a leading edge of a pulse of the signal Vc and a leading edge of a subsequently coming pulse of the signal Vb is measured by reading the value of the timer at the instants of the presence of these leading edges by the microcomputer 10 in the same manner as the measurement of the duration $T_T$ which has been described in the above in detail. Once the duration $T'_T$ is obtained, an angle of the crankshaft rotated from the instant of actual fuel injection till the instant of the reference crank angle, namely an actual fuel injection timing with respect to the reference crank angle is obtained by using the rotational speed of the engine. From the above, it will be understood that the signal from the actual fuel injection timing detector 5A may be used in the same manner as the signal from the actual ignition timing detector 5 used in the first-described embodiment.

Figure 20:
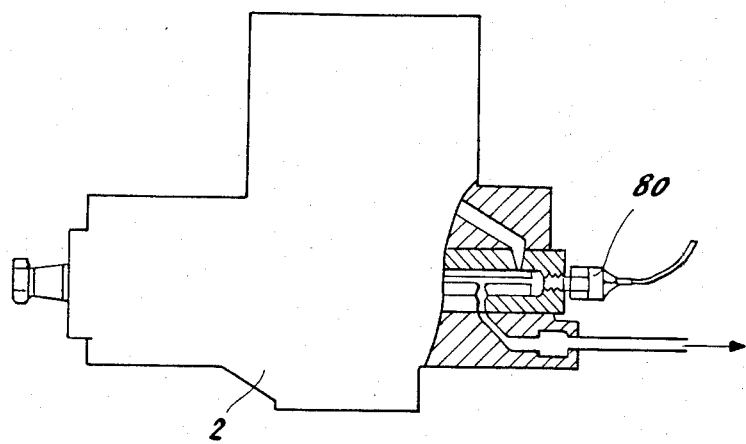
FIG. 20 is a schematic partial cross-sectional view showing an injection pressure detector, which may be used as the fuel injection timing detector.
Figure 21:
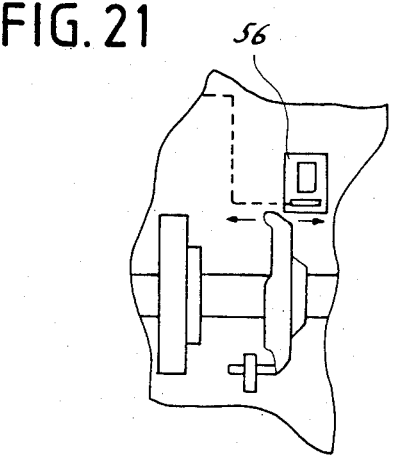
FIG. 21 is a schematic view of a cam-lift detector which may be used as the fuel injection timing detector.

In order to detect the fuel injection timing, however, an injection pressure detector 80 shown in FIG. 20 may be used in place of the detector 51 of FIGS. 17 and 18. This detector 80 is installed in the fuel injection pump such that fuel pressure in a fuel compression-distribution chamber is detected. Furthermore, a lift detector 56 of FIG. 21, which detects a lifted state of a cam driving the plunger of the fuel injection pump, may be used as such a fuel injection timing detector. Such a lift detector 56 may comprise a Hall generator and a magnet for electromagnetically detecting the lifted cam. Moreover, a vibration sensor, which detects the vibrations on combustion occurring at the time of igition, a pressure indicator, which detects an instant of sudden change in pressure within the engine cylinder, or an ion current detector, which detects flow of ion within the engine cylinder occurring on ignition, may also be used as such a fuel injection or ignition timing detector.

From the foregoing it will be understood that since the basic duty cycle of the drive signal for the fuel injection timing adjusting device 3 of FIGS. 1 and 2 is corrected by using the correction factor $D_C$ and the forecast correction factor $D_D$, the fuel injection and therefore ignition timing of a diesel engine can be accurately controlled with quick response. As a result, noxious components of the exhaust gasses are reduced, while fuel cost is reduced. Furthermore, the apparatus for controlling the fuel injection timing is prevented from malfunctioning by a fail-safe function which prohibits error calculation when the timing signal is inappropriate.

The above-described embodiments are just examples of the present invention, and therefore, it will be apparent for those skilled in the art that many modifications and variations may be made without departing from the spirit of the present invention.

What is claimed is:

1. Apparatus for controlling fuel injection timing for use with a diesel engine, comprising:
    (a) an engine rotational speed detector for producing a first signal indicative of the rotational speed of said engine;
    (b) a fuel injection quantity detector for producing a second signal indicative of the quantity of fuel injected into cylinders of said engine;
    (c) a reference position detector for producing a third signal indicative of a reference angle of a crankshaft of said engine;
    (d) a fuel injection or ignition timing detector for producing a fourth signal indicative of the timing of fuel injection or ignition;
    (e) a fuel injection pump equped with a fuel injection timing adjusting device which is controlled by a drive signal having a variable duty cycle; and
    (f) a computing means responsive to said first through fourth signals,
        for calculating a basic duty cycle $D_B$ for said drive signal by using said first and second signals;
        for calculating a desired fuel injection or ignition timing $\theta i$ by using said first and second signals;
        for calculating an actual fuel injection or ignition timing $\theta R$ by using said third and fourth signals;
        for calculating the difference $\Delta\theta$ between said desired fuel injection or ignition timing $\theta i$ and said actual fuel injection or ignition timing $\theta R$;
        for calculating a correction factor $D_C$ by using said difference $\Delta\theta$;
        for calculating a forecast correction factor $D_D$ by detecting the change in said basic duty cycle $D_B$ or said desired fuel injection or ignition timing $\theta_i$;
        for correcting said basic duty cycle $D_B$ by said correction factor $D_C$ and said forecast correction factor $D_D$ for obtaining an output duty cycle D; and for outputting said drive signal having said output duty cycle D.

2. Apparatus as claimed in claim 1, wherein said computing means is arranged to obtain said correction factor $D_C$ by integrating said difference $\Delta\theta$.

3. Apparatus as claimed in claim 1, wherein said computing means is arranged to obtain said correction factor $D_C$ with said difference $\Delta\theta$ being multiplied with a constant.

4. Apparatus as claimed in claim 1, wherein said computing means is arranged to obtain said correction factor $D_C$ as a sum of a first value obtained by integrating said difference $\Delta\theta$ and a second value obtained with said difference $\Delta\theta$ being multiplied with a constant.

5. Apparatus as claimed in claim 1, wherein said computing means is arranged to obtain a mean value of a plurality of values of said difference, and to use said means value as said difference.

6. Apparatus as claimed in claim 1, wherein said computing means is arranged to obtain said forecast correction factor $D_D$ by detecting the varying rate of said basic duty cycle $D_B$.

7. Apparatus as claimed in claim 1, wherein said computing means is arranged to obtain said forecast correction factor $D_D$ by detecting the varying rate of said desired fuel injection or ignition timing $\theta i$.

8. Apparatus as claimed in claim 1, wherein said computing means is arranged to detect an abnormal condition of said fuel injection or ignition timing detector, and to correct said basic duty cycle $D_B$ by only said correction factor $D_D$.

9. Apparatus as claimed in claim 8, wherein said computing means is arranged to correct said basic duty cycle $D_B$ by using the following first formula when said fuel injection or ignition timing detector is detected to be normal:

$$D = D_B + D_D + D_C$$

and to correct said basic duty cycle $D_B$ by the following second formula when said fuel injection or ignition timing detector is detected to be abnormal:

$$D = D_B + D_D.$$

10. Apparatus as claimed in claim 1, wherein said fuel injection or ignition timing detector comprises an ignition timing detector having a photosensitive element located in the vicinity of a fuel injection nozzle of said engine.

11. Apparatus as claimed in claim 1, wherein said fuel injection or ignition timing detector comprises a fuel injection timing detector of valve-lift detector type, associated with a valve body of a fuel injection nozzle of said engine.

12. Apparatus as claimed in claim 1, wherein said fuel injection or ignition timing detector comprises a fuel injection timing detector of injection pressure detection type, associated with a compression-distribution chamber of a fuel pump from which fuel is supplied to said engine.

13. Apparatus as claimed in claim 1, wherein said fuel injection or ignition timing detector comprises a fuel injection timing detector of cam-lift detection type, associated with a cam driving a plunger of a fuel pump from which fuel is supplied to said engine.

14. Apparatus as claimed in claim 1, further comprising means for detecting engine operating condition, and wherein said computing means is arranged to correct said basic duty cycle $D_B$ by detected engine operating condition so that a corrected duty cycle is used as said basic duty cycle $D_B$.

* * * * *